United States Patent
Yun et al.

(10) Patent No.: US 8,810,201 B2
(45) Date of Patent: Aug. 19, 2014

(54) BATTERY MANAGEMENT SYSTEM AND BATTERY MANAGEMENT METHOD

(75) Inventors: Han-Seok Yun, Suwon-si (KR); Yusai Murakami, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 344 days.

(21) Appl. No.: 12/626,704

(22) Filed: Nov. 27, 2009

(65) Prior Publication Data

US 2010/0134070 A1 Jun. 3, 2010

(30) Foreign Application Priority Data

Dec. 1, 2008 (KR) ........................ 10-2008-0120668

(51) Int. Cl.
*H02J 7/00* (2006.01)
(52) U.S. Cl.
USPC ............................. 320/118; 320/116; 320/122
(58) Field of Classification Search
CPC ....................................................... Y02E 60/12
USPC ................................................. 320/116, 118
See application file for complete search history.

(56) References Cited

U.S. PATENT DOCUMENTS

| 6,072,300 | A  | * | 6/2000  | Tsuji ............................. 320/116 |
| 7,180,267 | B2 | * | 2/2007  | Nakada ......................... 320/132 |
| 7,804,276 | B2 | * | 9/2010  | Roessler ....................... 320/118 |
| 8,183,833 | B2 | * | 5/2012  | Kobayashi .................... 320/118 |

FOREIGN PATENT DOCUMENTS

| JP | 2000-92732 | 3/2000 |
| JP | 2001-231178 | 8/2001 |
| JP | 2002-10512 | 1/2002 |
| JP | 2003-284253 | 10/2003 |
| JP | 2003-309931 | 10/2003 |
| JP | 2004-80909 | 3/2004 |
| WO | WO 2007/085105 A1 * | 8/2007 ............... H02J 7/00 |

* cited by examiner

*Primary Examiner* — Edward Tso
*Assistant Examiner* — Ahmed Omar
(74) *Attorney, Agent, or Firm* — Christie, Parker & Hale, LLP

(57) ABSTRACT

A battery management system and a driving method thereof, to set a discharge completion voltage using the cell voltages of cells of a battery, and to balance the cell voltages according to the set discharge completion voltage.

9 Claims, 3 Drawing Sheets

BATTERY MANAGEMENT SYSTEM AND BATTERY MANAGEMENT METHOD

CROSS-REFERENCE TO RELATED APPLICATION

This application claims the benefit of Korean Application No. 10-2008-0120668, filed on Dec. 1, 2008, in the Korean Intellectual Property Office, the disclosure of which is incorporated herein by reference.

BACKGROUND OF THE INVENTION

1. Field of the Invention

Aspects of the present invention relate to a battery management system and method.

2. Description of the Related Art

In general, vehicles having only a conventional internal combustion engine are considered to be one of the primary causes of environmental pollution. Accordingly, in recent years, in order to decrease environmental pollution, electric vehicles and hybrid vehicles have been actively developed.

An electric vehicle uses an electric motor that is powered by electricity output from a battery having a plurality of rechargeable secondary cells. Since electric vehicles use a battery as a main power source, exhaust gas is not generated, and little operating noise is produced.

A hybrid vehicle is an intermediate stage between a conventional internal combustion engine vehicle and an electric vehicle. A hybrid vehicle uses two or more power sources, for example, an internal combustion engine and a battery-powered motor. At the present time, a hybrid vehicle that uses an internal combustion engine and a fuel cell, where electrical energy is directly generated by chemically reacting hydrogen and oxygen, and a hybrid vehicle that uses a battery and a fuel cell, are being developed.

The number of secondary cells included in a battery is increasing, in order to discharge and store more power. Therefore, a cell balancing control method that can efficiently manage a plurality of connected cells in such batteries is needed in a battery management system (hereinafter referred to as BMS).

When a battery includes a plurality of cells that are connected in series, balancing the cells is important. Such cell balancing refers to minimizing a difference between the voltages of the cells, to within an allowable range. Hereinafter, the balancing the cell voltages is referred to as "cell balancing." Cell balancing is important for maintaining the life-span and power output of a battery.

During cell balancing, a conventional battery management system adds a predetermined value to a state of charge (SOC) value (the lowest cell voltage of a plurality of cell voltages), to determine a discharge completion voltage. Such a conventional battery management system uses the discharge completion voltage to balance the cells. However, there is a limitation in that cell balancing is performed using one discharge completion voltage. The above information disclosed in this Background section is only for enhancement of understanding of the background of the invention, and therefore, it may contain information that does not form the prior art that is already known in this country, to a person of ordinary skill in the art.

SUMMARY OF THE INVENTION

Aspects of the present invention provide a battery management system and method, to reduce a capacity deviation between cells of a battery.

An exemplary embodiment of the present invention provides a battery management system. The battery management system includes a plurality of cells, a cell balancing unit that balances the voltages of the cells, and an MCU that measures the cell voltages, to detect whether any of the cell voltages are unbalanced, and controls the cell balancing unit. The MCU performs a control operation, until the voltage of the unbalanced cell reaches a discharge completion voltage. The discharge completion voltage can be a difference between a maximum cell voltage and a minimum cell voltage of the cells. The discharge completion voltage can be obtained by adding an error voltage to the minimum voltage. The discharge completion voltage can be obtained by adding a capacity deviation target voltage to the minimum voltage.

Another exemplary embodiment of the present invention provides a battery management system. The battery management system includes a plurality of cells, a cell balancing unit that balances the voltages of the cells, and an MCU that measures the cell voltages, to detect an unbalanced cell, and controls the cell balancing unit. The MCU controls the cell balancing unit to perform a control operation until the voltage of the unbalanced cell reaches an average of at least two of the cell voltages. In some embodiments, the cell balancing unit discharges the unbalanced cell until the cell voltage thereof reaches an average of all the cell voltages, in accordance with the control by the MCU.

Yet another exemplary embodiment of the present invention provides a battery management method. The battery management method includes: measuring the cell voltages of a plurality of cells; comparing the measured cell voltages to a discharge completion voltage, to determine whether any of the cells are unbalanced; and discharging any unbalanced cell, in accordance with the discharge completion voltage. The discharge completion voltage is less than the highest cell voltage and is greater than the lowest cell voltage. The discharge completion voltage can be obtained by adding an error voltage to the lowest cell voltage. The discharge completion voltage can be obtained by adding a capacity deviation target voltage to the lowest cell voltage.

Still another exemplary embodiment of the present invention provides a battery management method. The battery management method includes: measuring the cell voltages of a plurality of cells; comparing the measured cell voltages to a discharge completion voltage, to determine whether any of the cells are unbalanced; and discharging any unbalanced cell, in accordance with the determined discharge completion voltage. The discharge completion voltage can be higher than the lowest cell voltage.

According to aspects of the present invention, the discharge completion voltage can be an average of all of the cell voltages. The discharge completion voltage can be an average of some of the cell voltages, according to some aspects.

According to the exemplary embodiments of the present invention, since discharge completion voltage can be set in various ways, using cell voltages of the various cells of a battery, a cell balancing operation can be efficiently performed.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
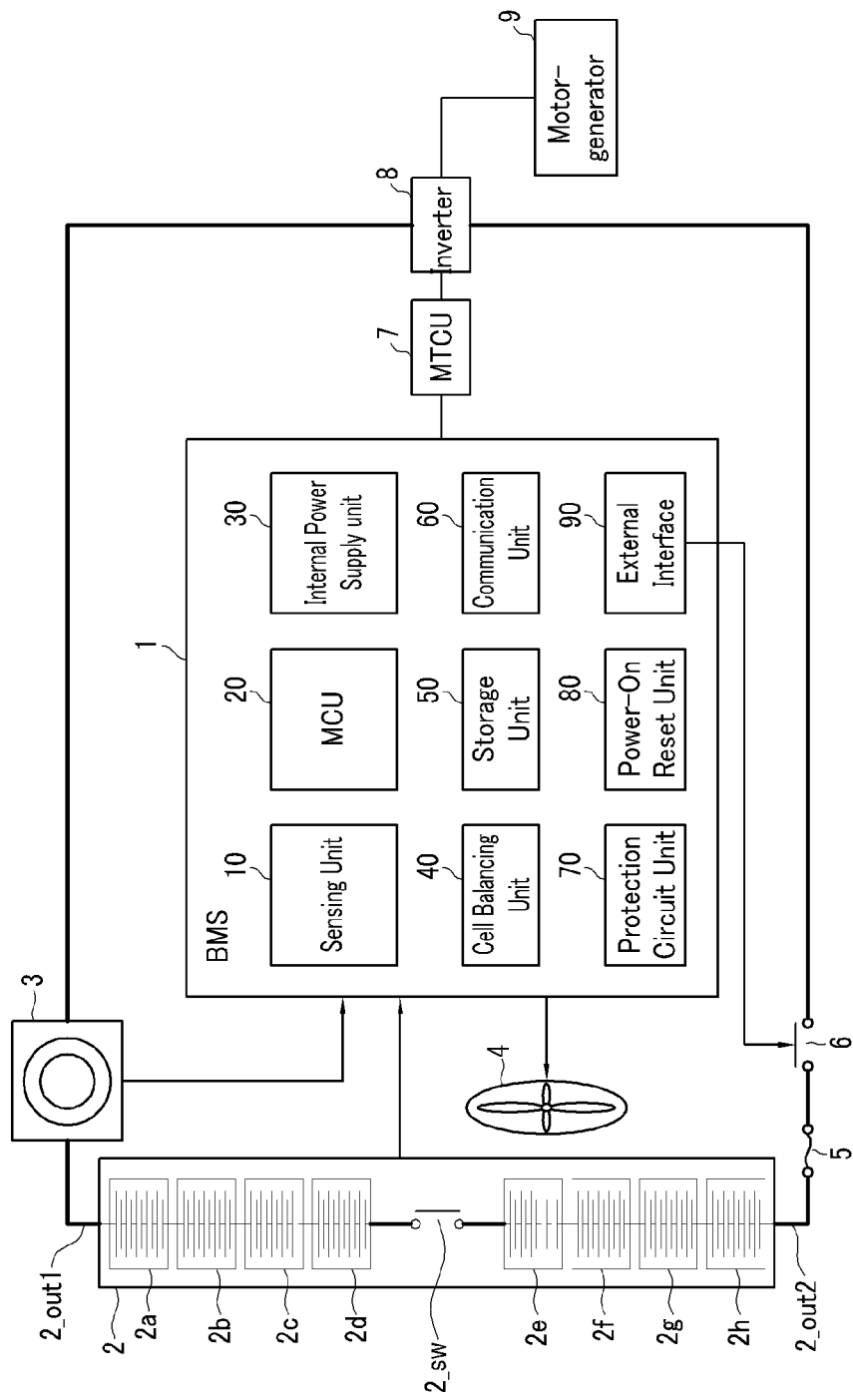
FIG. 1 is a schematic diagram illustrating a vehicle system including a battery, a battery management system (BMS), and peripheral devices of the BMS, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

In the following detailed description, only certain exemplary embodiments of the present invention have been shown and described, by way of illustration. As those skilled in the art would realize, the described exemplary embodiments may be modified in various different ways, all without departing from the spirit or scope of the present invention. Accordingly, the drawings and description are to be regarded as illustrative in nature and not restrictive.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a schematic diagram illustrating a vehicle system, according to an exemplary embodiment of the present invention. As shown in FIG. 1, the vehicle system includes a battery management system (BMS) 1, a battery 2, a current sensor 3, a cooling fan 4, a fuse 5, a main switch 6, a motor control unit (MTCU) 7, an inverter 8, and a motor-generator 9.

The battery 2 (i.e., battery pack) includes a plurality of sub-packs 2a to 2h that are coupled in series, an output terminal 2_OUT1, an output terminal 2_OUT2, and a safety switch 2_SW that is provided between the sub-pack 2d and the sub-pack 2e. In this case, eight sub-packs 2a to 2h are exemplified. Each of the sub-packs 2a to 2h includes a group of battery cells connected in series, but the present invention is not limited thereto. The safety switch 2_SW is a switch that can be manually turned on/off, in order to ensure safety of a worker, when the worker replaces a battery or performs work on a battery. The safety switch 2_SW is shown to be provided between the sub-pack 2d and the sub-pack 2e, but the present invention is not limited thereto. The output terminal 2_OUT1 and the output terminal 2_OUT2 are connected to the inverter 8.

The current sensor 3 measures an output current of the battery 2 and outputs the measured output current to a sensing unit 10 of the BMS 1. Specifically, the current sensor 3 may be a Hall current transformer (HALL CT) that measures a current using a Hall element and outputs an analog current signal corresponding to the measured current. In the alternative, the current sensor 3 may be a shunt resistor that outputs a voltage signal, with respect to an amount of current that flows through a resistor provided on a load line.

The cooling fan 4 dissipates heat that may be generated during charging and/or discharging of the battery 2, on the basis of a control signal from the BMS 1. The cooling fan 4 prevents the battery 2 from being damaged, and/or prevents a reduction in the charge and discharge efficiency of the battery 2, due to an increase in the temperature thereof.

The fuse 5 prevents an overcurrent from being transmitted to the battery 2, due to a break or a short of the battery 2. That is, if an overcurrent is generated, the fuse 5 is broken, and the transmission of the overcurrent to the battery 2 is stopped.

If an abnormal phenomenon, such as an overvoltage, an overcurrent, or a high temperature is generated, the main switch 6 turns the battery 2 off. The main switch 6 is controlled on the basis of a control signal from the BMS 1 or the MTCU 7.

The BMS 1 includes a sensing unit 10, a micro-control unit (MCU) 20, an internal power supply unit 30, a cell balancing unit 40, a storage unit 50, a communication unit 60, a protection circuit unit 70, a power-on reset unit 80, and an external interface 90. The sensing unit 10 measures the total current of the battery 2 (pack current), the total voltage of the battery 2 (pack voltage), the temperature of the battery 2 (pack temperature), and the ambient temperature. The sensing unit 10 transmits the measured values to the MCU 20.

The MCU 20 controls the voltage measurement of each cell of the battery 2 and uses the measured cell voltages to determine whether cell balancing should be performed. The MCU 20 applies a corresponding control signal to the cell balancing unit 40.

The internal power supply unit 30 generally supplies power to the BMS 1, using an auxiliary battery. The cell balancing unit 40 receives a control signal from the MCU 20 and discharges an unbalanced cell, or cells, to a target voltage. The storage unit 50 stores data, such as the state of charge (SOC) and/or the state of health (SOH) of the battery 2, when a power supply of the BMS 1 is turned off. In this case, the storage unit 50 may be a non-volatile storage device that can electrically write and erase data, for example, an electrically erasable programmable read-only memory (EEPROM).

The communication unit 60 communicates with the MTCU 7. The communication unit 60 transmits the SOC and SOH from the BMS 1 to the MTCU 7, receives vehicle state information from the MTCU 7, and transmits the information to the MCU 20. The protection circuit unit 70 is a secondary circuit that additionally protects the battery 2 from overcurrents and/or overvoltages, using a hardware element. Firmware that is installed in the MCU 20 performs a primary protection operation. The power-on reset unit 80 resets the entire system, when the power supply of the BMS 1 is turned on. The external interface 90 connects auxiliary devices to the BMS 1, such as the cooling fan 4 and the main switch 6. In the present exemplary embodiment, only the cooling fan 4 and the main switch 6 are shown, but the present invention is not limited thereto.

The MTCU 7 recognizes a current operation state of the vehicle, on the basis of the vehicles acceleration, braking, and/or speed. The MTCU 7 determines information, such as torque needs of the vehicle. In further detail, the current operation state of the vehicle refers to a key on state (whether the vehicle is turned on), key off state (whether the vehicle is turned off), the current velocity of the vehicle, and/or the current acceleration of the vehicle. The MTCU 7 transmits the current operation state to the communication unit 60 of the BMS 1. The MTCU 7 controls output of the motor-generator 9, according to the torque information. That is, the MTCU 7 controls switching of the inverter 8 and controls the output of the motor-generator 9, to match the torque information.

The MTCU 7 receives the SOC of the battery 2 from the MCU 20, through the communication unit 60, and controls the SOC of the battery 2 according to a target value (e.g., 55%). For example, when the SOC transmitted from the MCU 20 is 55%, or less, the MTCU 7 controls the inverter 8 to output power to the battery 10, so as to charge the battery 2. In this example, the MTCU 7 may set a current of the battery 2 as a negative value. Meanwhile, when the SOC is greater than 55%, the MTCU 7 controls the inverter 8 to output power to the motor-generator 9, so as to discharge the battery 2. In this example, the MTCU 7 may set the current of the battery 2 as a positive value.

The inverter 8 causes the battery 2 to be charged or discharged, on the basis of a control signal from the MTCU 7. The motor-generator 9 drives the vehicle using the electrical energy of the battery 2, on the basis of torque information transmitted from the MTCU 7.

In short, the MTCU 7 charges or discharges the battery 2, on the basis of the SOC, to prevent the battery 2 from being overcharged or overdischarged, to prolong the usable life of the battery 2. However, after the battery 2 is mounted to the vehicle, it is difficult to measure the actual SOC of the battery 2. Thus, the BMS 1 accurately estimates the SOC using the pack current, the pack voltage, and the pack temperature, sensed by the sensing unit 10. The BMS 1 transmits the estimated SOC to the MTCU 7.

Figure 2:
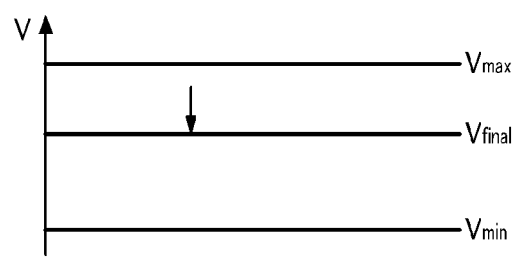
FIGS. 2 to 5 are diagrams illustrating a battery management method, according to an exemplary embodiment of the present invention.

FIGS. 2 to 5 are diagrams illustrating a battery management method, including a control operation to determine a cell capacity deviation, according to an exemplary embodiment of the present invention. Referring to FIG. 2, first, the MCU 20 measures and stores the voltages of the cells of the battery 2 (cell voltages). The MCU 20 compares the stored cell voltages to a predetermined reference voltage (discharge completion voltage), and detects whether any of the cells are unbalanced.

In order to discharge an unbalanced cell, for example, an overcharged cell, the MCU 20 controls the cell balancing unit 40 to discharge the overcharged cell. Specifically, the MCU 20 transmits a control signal, to control discharge of the overcharged cell, to the cell balancing unit 40. In this case, the control signal is output to the cell balancing unit 40, until the cell voltage of the unbalanced cell reaches a discharge completion voltage Vfinal. The discharge completion voltage Vfinal, as shown in FIG. 2, is the difference between a maximum voltage Vmax of the cells (the highest cell voltage) and a minimum voltage Vmin of the cells (the lowest cell voltage). The cell balancing unit 40 discharges an unbalanced cell to the discharge completion voltage Vfinal, in accordance with the control signal. The difference in charge capacity between the cells can be minimized, through the above processes.

Figure 3:
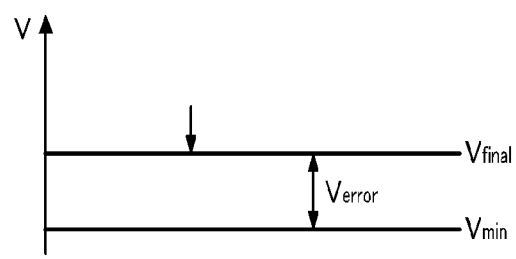
Figure 4:
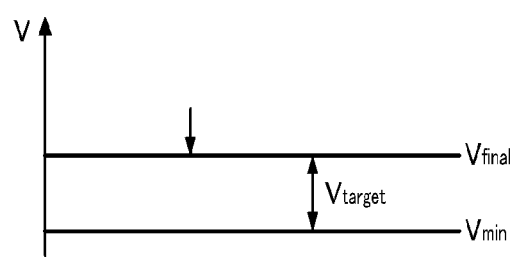

The discharge completion voltage Vfinal may be obtained by adding an error voltage Verror to the minimum voltage Vmin, as shown in FIG. 3. Alternatively, the discharge completion voltage Vfinal may be obtained by adding a capacity deviation target voltage Vtarget to the minimum voltage Vmin, as shown in FIG. 4.

Figure 5:
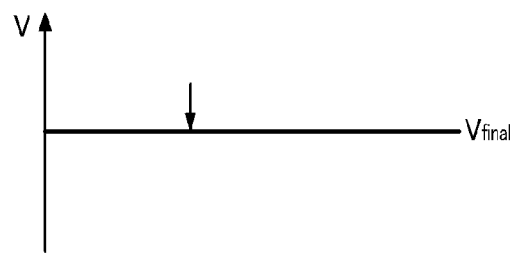

The discharge completion voltage Vfinal may be an average of some or all of the cell voltages, as shown in FIG. 5. For example, the discharge completion voltage Vfinal may be an average of voltages of only certain ones of the cells, for example, the first, sixth, and eleventh cells.

As such, the battery management system and the driving method thereof, according to the exemplary embodiments of the present invention, can efficiently minimize a capacity deviation between cells, according to a discharge completion voltage, using various methods, during a cell balancing operation.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A battery management system, comprising:
cells having cell voltages;
a cell balancing unit that performs a control operation to balance the cell voltages; and
a micro-control unit (MCU) that measures the cell voltages, to detect whether one or more of the cells are unbalanced, and controls the cell balancing unit to perform the control operation until the cell voltages of the one or more unbalanced cells reach a discharge completion voltage,
wherein the discharge completion voltage is equal to a difference between a highest cell voltage and a lowest cell voltage, or is equal to an average of the cell voltages of less than all of the cells.

2. A battery management system, comprising:
cells having cell voltages;
a cell balancing unit that performs a control operation to balance the cell voltages; and
a micro-control unit (MCU) that measures the cell voltages, to detect whether one or more of the cells are unbalanced, and controls the cell balancing unit, to perform the control operation until the cell voltages of the one or more unbalanced cells reach an average of less than all of the cell voltages or reach a voltage equal to a difference between a highest cell voltage and a lowest cell voltage.

3. The battery management system of claim 2, wherein the cell balancing unit discharges the one or more unbalanced cells until the cell voltages of the one or more unbalanced cells reach an average of highest and lowest cell voltages.

4. A battery management method comprising:
measuring voltages of cells;
comparing the measured voltages of the cells to a discharge completion voltage, to determine whether one or more of the cells are unbalanced; and
discharging the one or more unbalanced cells to the discharge completion voltage,
wherein the discharge completion voltage is equal to an average of cell voltages of less than all of the cells, or is equal to a difference between a highest cell voltage and a lowest cell voltage.

5. A battery management method comprising:
measuring cell voltages of cells;
comparing the measured cell voltages to a discharge completion voltage, to determine whether one or more of the cells are unbalanced; and
discharging the one or more unbalanced cells to the discharge completion voltage,
wherein the discharge completion voltage is an average of less than all of the cell voltages, or is a difference between a highest cell voltage and a lowest cell voltage.

6. The battery management system of claim 1, wherein a period for the control operation to balance the cell voltages is determined solely based on whether or not the cell voltages of the one or more unbalanced cells reach the discharge completion voltage.

7. The battery management system of claim 2, wherein a period for the control operation to balance the cell voltages is determined solely based on whether or not the cell voltages of the one or more unbalanced cells reach the average of the at least two of the cell voltages.

8. The battery management method of claim 4, wherein a period for said discharging the one or more unbalanced cells to the discharge completion voltage is determined solely based on whether or not the voltages of the one or more unbalanced cells reach the discharge completion voltage.

9. The battery management method of claim 5, wherein a period for said discharging the one or more unbalanced cells to the discharge completion voltage is determined solely based on whether or not the cell voltages of the one or more unbalanced cells reach the discharge completion voltage.

* * * * *